(No Model.)
C. T. McINTOSH.
COTTON CHOPPER.
No. 388,139. Patented Aug. 21, 1888.
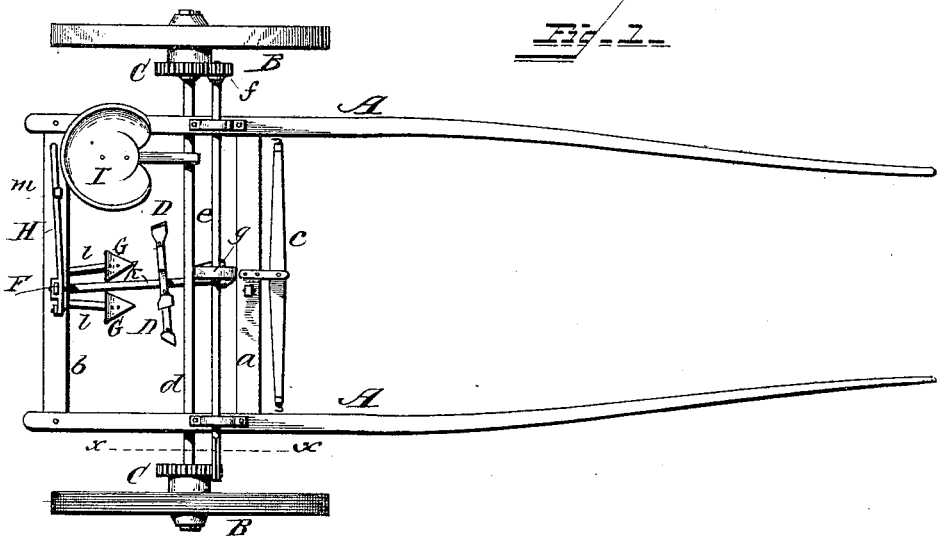
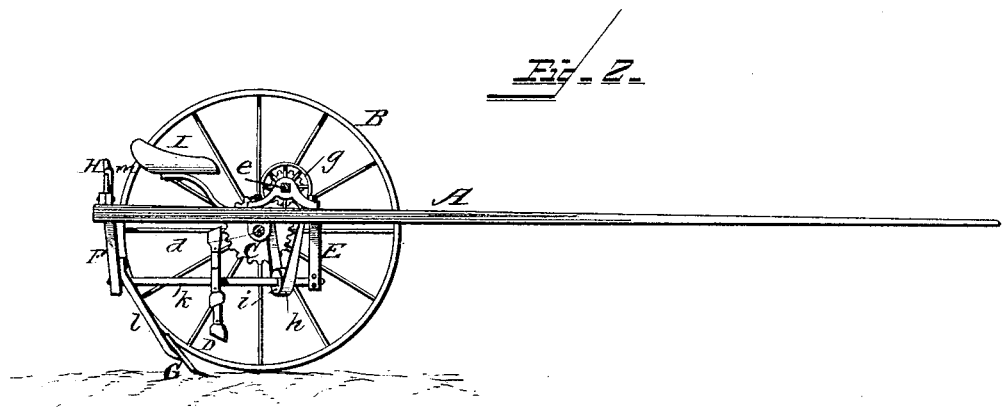
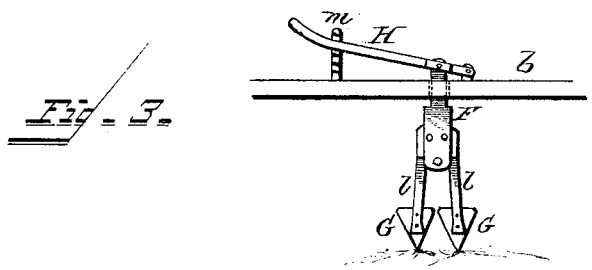
Witnesses
Albert Speider
Wm B. Cummings
Inventor
Clark T. McIntosh.
By his Attorney
Chas. N. Fowler

United States Patent Office

CLARK TUCKER McINTOSH, OF DADEVILLE, ALABAMA.

COTTON-CHOPPER.

SPECIFICATION forming part of Letters Patent No. 388,139, dated August 21, 1888.

Application filed May 29, 1888. Serial No. 275,481. (No model.)

*To all whom it may concern:*

Be it known that I, CLARK TUCKER McINTOSH, a citizen of the United States, residing at Dadeville, in the county of Tallapoosa and State of Alabama, have invented certain new and useful Improvements in Cotton-Choppers; and I do hereby declare that the following is a full, clear, and exact description of the same, reference being had to the annexed drawings, making a part of this specification, and to the letters and figures of reference marked thereon.

Figure 1 of the drawings is a top plan view of my improved cotton-chopper; Fig. 2, a side elevation with the wheel and its attachments in section, as indicated by dotted line $x$ $x$ of Fig. 1; and Fig. 3, a detail view of the mechanism for adjusting the hoes and plows.

The present invention has for its object to provide a cotton-chopper that will be practical in its results, easy of operation, and capable of chopping either one or two rows, as found desirable, and easily controlled by the driver on the seat.

The invention consists in the several details of construction, substantially as shown in the drawings, and hereinafter described and claimed.

In the accompanying drawings, A represents the usual shafts, which form the side bars of the frame of the machine, and connected together by the transverse bars $a$ $b$, to the former of which is attached the singletree $c$. The rear extensions of the shafts and the two transverse bars connected thereto, as above described, form together the frame of the machine.

To the under side of the rear portion of the shafts is journaled the axle $d$, upon which are loosely mounted the wheels B, the hubs of which are provided with gear-wheels C. A shaft, $e$, has its bearings in the upper side of the extensions of the shafts A and extends longitudinally with the axle $d$, and has upon one or both ends a pinion, $f$, to engage with the teeth of the wheels C.

To the shaft $e$ is keyed a pulley, $g$, over which passes a belt, $h$, from a pulley, $i$, said pulley being keyed to a shaft, $k$, extending at right angles to the shaft $e$ and below the axle.

Upon the shaft $k$ are attached the hoes D, which revolve with the shaft, and the shaft has its bearings in hangers E F, depending from the under side of the transverse bars $a$ $b$, respectively. The hanger F is movable up and down in an opening in the bar $b$, and has connected to it the standards $l$, to which the plows G are attached. The upper end of the hanger F has pivoted to it a hand-lever, H, said lever being in turn pivoted to the transverse bar $b$, and by raising and lowering the lever the height of both the plows and hoes is adjusted, and they are held in their adjusted position by a notched bar, $m$, to which the end of the lever is engaged. A seat, I, is provided for the driver, which may be attached to the axle or any portion of the frame desired. When the shaft $k$ is raised by means of the lever H, the belt $h$ will become loose sufficiently so as to stop the action of the hoes, and when the hanger F is lowered by means of the lever the shaft will also be lowered, which will draw the belt tight around the pulleys and cause the hoes to revolve.

Having now fully described my invention, what I claim as new, and desire to secure by Letters Patent, is—

In a cotton-chopper, the axle $d$, with gear-wheels C, and the shaft $e$, with pinion $f$ and pulley $g$, in combination with the shaft $k$, having pulley $i$ and belt $h$, and the hoes D, connected to said shaft, the adjustable hanger F, in which the shaft has its bearings, and the plow and standards connected to the hanger, substantially as and for the purpose set forth.

In testimony that I claim the above I have hereunto subscribed my name in the presence of two witnesses.

CLARK TUCKER McINTOSH.

Witnesses:
P. M. SHEPARD,
J. L. McINTOSH.